United States Patent

[11] 3,619,373

| [72] | Inventors | Bernard Dixon<br>Harpenden;<br>Alan Arthur Douglas Comrie, Manchester,<br>both of England |
|---|---|---|
| [21] | Appl. No. | 735,181 |
| [22] | Filed | June 7, 1968 |
| [45] | Patented | Nov. 9, 1971 |
| [73] | Assignee | The Enzymic Malt Company Limited<br>London, England |
| [32] | Priority | June 8, 1967 |
| [33] | | Great Britain |
| [31] | | 26619/67 |

[54] PROCESS FOR MALTING GERMINATED GRAIN
4 Claims, No Drawings

[52] U.S. Cl. .................................................. 195/70, 99/53
[51] Int. Cl. .................................................. A23i 1/00
[50] Field of Search ............................................ 195/70, 69.71; 99/50, 53, 52

[56] References Cited
UNITED STATES PATENTS

| 3,168,449 | 2/1965 | Hollenbeck et al. .......... | 195/70 |
| 3,272,718 | 9/1966 | Comrie et al. ................ | 195/70 |

FOREIGN PATENTS

| 1,076,883 | 7/1967 | Great Britain ................ | 195/70 |

*Primary Examiner*—A. Louis Monacell
*Assistant Examiner*—Gary M. Nath
*Attorney*—Larson, Taylor & Hinds

ABSTRACT: A process of malting for the production of acid malt involving subjecting grain having a low percentage of potential extract (less than 75 percent) to oxygen-free conditions at chitting (rootlet emergence) or at an early stage after chitting. The period of exposure to these conditions is at least 2 days at temperatures of 10° C. to 36° C. and the preferred moisture content of the grain is high (35 to 50 percent). Drying temperatures are low (i.e., below about 55° C.) if normal colored acid malt is needed, but a novel and very highly colored dried acid malt may be obtained if drying is carried on at temperatures above 80° C.

PROCESS FOR MALTING GERMINATED GRAIN

This invention concerns a process which is to produce an acid malt, which is an additive of high acid content used in conjunction with ordinary malt.

In the specification of United Kingdom Pat. No. 1,076,883 there was disclosure of a malt being subjected to anaerobic conditions. This was not merely grown grain but was one which had reached a specified degree of malting, namely its extract was at least 75 percent of the potential (predicted) extract. The product of that process was an acid malt of desirable qualities and usually having an acid content of around 3 to 4 percent. This was achieved under the comparatively mild conditions involved because as starting material there was selected this semiprepared malt (which could indeed have been finished "green" or unkilned malt) which, when subjected to the anaerobic conditions, rapidly gave rise to the desired products. The anaerobic respiration stimulated the enzyme system already present in reasonable quantities in such malt.

It has now been found that if grain of any suitable sort is subjected to an oxygen-free atmosphere at sufficiently severe temperature and/or moisture conditions and/or for a sufficiently long time an acid malt may be produced from any grain having an extract which is less than 75 percent of the potential and which yet has sufficient initial enzyme activity to permit the necessary changes to occur.

The test of whether a grain has sufficient initial enzyme activity for use in the present process is that it should have chitted—that is to say the rootlets must have just begun to appear.

The prime distinction between the present process and the invention of United Kingdom specification 1,076,883 is that the starting material may have a very much lower percentage of potential extract and that the times involved in the anaerobic stage are longer. The prime distinction between this present process and those for producing brewer's malt which have an anaerobic phase (e.g., U. K. Pat. Nos. 907,305 and 1,025,263 is that (1) the anaerobic phase is started much earlier in the grain life (that is to say there is a very short growth phase after steeping), (2) the anaerobic phase is longer, and (3) there is no necessary reexposure after this anaerobic phase to any oxygen atmosphere, prior to use or preservation by, for example, Kilning.

By this process it is possible to produce a malt having anything from an acidity comparable to that occurring in ordinary malt to one having an acidity comparable to that of U. K. specification 1,076,883.

The general considerations are that the longer the anaerobic storage, the higher the temperature up to about 36° C. and the higher the moisture content the more acid will be produced. Also, the lower the initial value of percentage of potential extract, the longer or more severe will these conditions need to be to produced a malt of a given acidity.

It is to be borne in mind that as the anaerobic phase continues the temperature tends to rise during the storage. Natural temperatures rise and acidity in the final product can be roughly correlated in a direct proportionality—excessive temperature rise may produce undesirable byproducts and may destroy the enzyme systems, hence it is usual to hold the temperature approximately constant throughout the anaerobic stage. Temperatures as high as 40° C. will destroy the proteolytic enzyme systems.

The chitted grain used as starting material may have been further germinated for a brief period (still being shorter than that for producing normal green malt) but since it has an extract which is less than 75 percent of potential extract it is not grain which would usually be recognized as any form either of finished or of green malt.

According to the present invention a process for producing an acid malt by inducing anaerobic respiration in chitted grain includes the steps of exposing chitted grain having an extract which is less than 75 percent of its potential extract and having a moisture content of 35 percent to 50 percent to an oxygen-free gaseous atmosphere for a period of at least 2 days at a temperature of 10° C. to 36° C., the period being chosen in an inverse relationship with the temperature. The resulting acid malt does not require the restoration of an oxygen atmosphere for completing modification as is the case with normal brewer's malt. The acid malt may be used directly or may be prepared for storage by some suitable method e.g., drying or freezing.

Particularly preferred conditions for the treatment involve the use of grain of a moisture content of 45 to 50 percent, a period of 5 days and a temperature of 33-36° C.

It can be seen from this that the anaerobic stage is continued longer and preferably at higher moisture content than the process disclosed in the said earlier patent.

Since the preferred moisture content is quite high it may be desirable to soak or spray the starting material with water before it is subjected to the anaerobic atmosphere and preferably the moisture content is increased to such a value that the grain will hold no more (this will be about 50 percent moisture). Excess water being drained off before treatment in the anaerobic atmosphere.

In one embodiment of the process the starting material is a grain which has been steeped and in which root growth has just begun (after steeping) before the anaerobic atmosphere is induced.

When stepping is carried out, it may be warm-stepping (with or without aeration or air-rest).

The term "extract" means the amount of soluble matter obtainable from that malt as determined by any of the accepted forms of analysis. For example Analytica, E. B. C. (Elsevier, 1963) or Journal of the Institute of Brewing, 1967, pages 233 to 245.

The term "extract" may be and is in fact applied to a malt before it is mashed even though the extract is obtained only as the result of determinations made after mashing.

"Potential extract" (also known as predicted extract) means the maximum amount of extract that can be obtained by any means of malting the cereal in question. "Anaerobic atmosphere" means an atmosphere which is completely free of oxygen. It may be produced either by displacing air from the container in which the grain is found by a nontoxic nonrespirable gas or by sealing the container in which the grain is contained so that continued respiration causes the remanent oxygen to be used up. Timing of the period of subjection to the anaerobic atmosphere will in the latter case begin only from the time when remanent oxygen has been exhausted. This respiration may take a time which depends on all the conditions surrounding that particular grain e.g., headspace, interstitial space but may be anything up to 12 hours.

An advantage of the anaerobic phase as described is that the absence of oxygen prevents the deterioration due to the development of spoilage micro-organisms which would occur in a chitted grain, and prevents further growth of acrospire or rootlets, with consequent loss from that source.

The malt product is usually dried at a temperature of between 45° C. and 55° C., which are somewhat lower than those commonly used for drying ordinary malts. The lower temperatures are used if an acid malt of normal color is desired because usual drying temperatures will produce, at least in such of the present malts as have a high acid content, a high color and low diastatic activity, but if a high color is desired a high temperature may be used for drying. This is because the high amino-nitrogen and soluble sugar content of such acid malts encourages color production when high temperatures (above 80° C. and preferably 100° C. or above) are applied to the malt.

Treatment of this kind results in a novel, highly colored dried acid malt prepared from any suitable grain and which has an acid content of 2 percent to 4 percent measured as lactic acid, and a color of at least 100 measured on the EBC scale (25 mm. cell).

The acid malt need not however be dried in a kiln but could be frozen or could be used directly in the green state or could be used to prepare a malt syrup or dried malt extract.

When the anaerobic atmosphere is produced by active displacement of an oxygen-containing atmosphere by another, a preferred gas for this purpose is carbon dioxide.

Barley or other grain may be treated by the present process.

Some specific examples of carrying out the invention will now be given.

EXAMPLE 1

Barley is stepped in water until its moisture content is approximately 46 percent. It is then drained, and immediately after it chits, it is placed in a vessel from which air is forthwith actively replaced by carbon dioxide. The vessel is sealed and held at a temperature of 32° C. for 7 days, after which it is opened and the grain is dried in a stream of air heated to 50° C.

EXAMPLE 2

Barley is stepped and drained as in example 1, held in air until the rootlets are approximately 2 mm. long, and subsequently treated with an anaerobic atmosphere as in example 1.

The results of these treatments are shown by the following figures obtained by analysis of the dried grain. (Institute of Brewing Recommended Methods).

| | Extract on dry basis, lb./qtr. | | Potential extract on dry basis, lb./qtr. | Colour, 25 mm. EBC | pH of mash | Acidity of grain as percent lactic acid | Cold water extract, percent | Soluble N, percent on dry basis |
|---|---|---|---|---|---|---|---|---|
| | Mashed alone | Mashed in presence of malt | | | | | | |
| Example: | | | | | | | | |
| 1 | 18.1 | 69.0 | 103.0 | 4.0 | 4.40 | 1.7 | 8.8 | |
| 2 | 20.4 | 76.4 | 103.0 | 3.5 | 4.05 | 2.7 | 13.5 | 0.71 |

NOTE: A quarter (qtr.) of malt is 336 pounds (lb.).

A further example serves to illustrate the effect of high-temperature drying on grain treated in the foregoing manner.

EXAMPLE 3

Barley is steeped, drained and held in air as in example 1 (i.e., until chitting), has a moisture content 48 percent, and has an extract which is about 20 percent of potential. It is placed in a vessel from which air is displaced by carbon dioxide, the vessel is sealed and held at a temperature of 35° C. for 5 days, after which it is opened and the grain is partly dried in a stream of air heated to 50° C. The grain is then held for 2 hours at a temperature of 125° C.

The finished product gave the following analysis.

| Extract on dry basis, lb./qtr. mashed in presence of malt. | Potential extract on dry basis, lb./qtr. | Colour, 25 mm. EBC | pH of mash | Acidity of grain as percent lactic |
|---|---|---|---|---|
| 78.4 | 103.0 | 125 | 4.60 | 2.1 |

When the range of acid content in the dried acid malt (measured on the same basis) is 2 to 4, color will exceed 100 (measured on the same basis) when temperatures in excess of 80° C. are applied in drying for an appropriate period.

What we claim is:

1. A process for malting grain to produce an acid malt which includes the steps of exposing chitted grain having an extract which is less than 75 percent of its potential extract and having a moisture content of 35 percent to 50 percent to an oxygen-free atmosphere for a period of at least 2 days at a temperature of 10° C. to 36° C.

2. A process according to claim 1 wherein the period of exposure is 5 days, the moisture content of the grain being 46 percent to 50 percent and the temperature 34° C. to 36° C.

3. A process according to claim 1 wherein acid malt is dried at a temperature of 45°–55° C.

4. A process according to claim 1 comprising the further step of drying the acid malt at a temperature above 80° C. to produce a dried acid malt of high color.

* * * * *